United States Patent Office 2,927,854
Patented Mar. 8, 1960

2,927,854

SEPARATION OF TANTALUM

George L. Martin, Wayland, Mass., assignor to National Research Corporation, Cambridge, Mass., a corporation of Massachusetts No Drawing. Application December 31, 1957
Serial No. 706,300

4 Claims. (Cl. 75—121)

This invention relates to the production of tantalum metal, and particularly to the separation of tantalum metal from the byproduct mixture resulting from the reduction of potassium fluotantalate with sodium metal.

The principal object of the present invention is to provide a process for separating tantalum metal from a mixture thereof with the byproduct potassium fluoride, sodium fluoride and excess $K_2TaF_7$.

Another object of the invention is to provide such a process which is rapid and relatively cheap.

Another object of the invention is to provide such a process which does not contaminate the product tantalum metal.

The invention accordingly comprises the process involving the several steps and the relation and the order of one or more of such steps with respect to each of the others which are exemplified in the following detailed disclosure and the scope of the application of which will be indicated in the claims.

For a fuller understanding of the nature and objects of the invention, reference should be had to the following detailed description.

In the production of tantalum metal by the metallothermic reduction of potassium fluotantalate with sodium, there is produced a mixture of crystalline aggregates of tantalum metal imbedded in solid potassium fluoride and sodium fluoride. This mixture of fluorides is quite insoluble in water and is very difficult to separate from the tantalum metal. Additionally, there may be present some unreacted potassium fluotantalate or other fluorides of tantalum even though these unreduced forms of tantalum are present in relatively small quantities.

In the present invention, the complex mixture of tantalum metal and the byproduct potassium fluoride and sodium fluoride is readily leached by the use of an aqueous acid solution which contains sufficient aluminum ion to provide a ratio of aluminum ion to fluoride ion between 1:1 to 1:6. The acid concentration of this aqueous acid leach solution is at least 1/10 N, and preferably 1/2 N or stronger. The acid is preferably a mineral acid, such as sulfuric, hydrochloric or nitric acid, sulfuric being preferred because of its relatively low cost. The aluminum ion has the very important dual functions of (a) complexing fluoride ions released into the aqueous solution so as to increase the solubility of the alkali fluorides and (b) preventing solution of the tantalum metal by hydrogen fluoride. The aluminum ion can form an extensive series of complex ions with the fluoride ion, these complexes being represented as $AlF^{++}$, $AlF_2^+$, $AlF_4^-$, $AlF_5^=$ and $AlF_6^\equiv$. It is preferred that there be sufficient aluminum ion present to form the complexes $AlF_4^-$ of $AlF_2^-$, since with the higher fluoride complexes $AlF_5^=$ and $AlF_6^\equiv$ some free HF will exist in the aqueous system to dissolve the tantalum metal. If too much aluminum ion is present, the aluminum ion will lower the fluoride ion concentration sufficiently so that any tantalum fluorides present in the system can be hydrolyzed (through the tantalum oxyfluoride) to the tantalum hydroxide which precipitates within the crystalline mass of tantalum to form an oxygen-containing impurity which can have a drastic effect on the ultimate purity of the tantalum metal. While this undesired reaction of excess aluminum to accomplish hydrolysis of tantalum fluorides can be counteracted by the presence of sufficient excess acid, it is economically undesirable to add the additional acid since no useful purpose is accomplished. Accordingly, it is preferred to maintain the ratio of aluminum ion to fluoride ion between 1:1 and 1:4.

In order to more fully understand the present invention, reference should be had to the following non-limiting examples:

*Example I*

550 grams of a reaction mixture consisting essentially of 181 grams of tantalum metal, 43 grams of $K_2TaF_7$, 116 grams of KF and 210 grams of NaF were removed from a reaction pot and crushed to more or less uniform size about 4–100 mesh. This product was added to a solution containing 665 grams of aluminum $Al_2(SO_4)_3$ and 8560 grams of an 8% solution of $H_2SO_4$. This gave a ratio mols of aluminum to mols of fluoride ion (in NaF+KF) of 1 to 1.8. This ratio of aluminum ion to fluoride ion is 1 to 1.63 when calculated on the basis of fluoride ion in the residual $K_2TaF_7$ as well. The mixture was agitated for 60 minutes, allowed to settle for 30 minutes and then decanted to separate the leach liquor from the residual solids. The residual solids were treated again as above and the product tantalum metal was then briefly leached in an etching solution of hydrogen fluoride and hydrogen peroxide for a few minutes as more fully described in the copending application of Martin, Serial No. 706,301, filed on even date herewith. This was followed with several more sulfuric acid leaches, rinsed with water, finally leached with methanol and dried under vacuum. The product had an oxygen content of 0.02% and a Brinell hardness of 110.

*Example II*

In still another embodiment of the invention the initial leach solutions contain aluminum chloride and HCl instead of the $H_2SO_4$ and $Al_2(SO_4)_3$ of Example I. In this case the leach solution contained 516 grams $AlCl_3$ and 8300 grams of 5% HCl. In other respects the procedures and quantities were the same as Example I.

Since certain changes may be made in the above process without departing from the scope of the invention herein involved, it is intended that all matter contained in the above description, shall be interpreted as illustrative and not in a limiting sense.

What is claimed is:

1. The process of separating tantalum metal from a mixture thereof with byproduct potassium fluoride and sodium fluoride which comprises leaching the mixture in an aqueous acid solution containing sufficient aluminum ion to provide a ratio of aluminum ion to fluoride ion between 1/1 and 1/6, the acid concentration being at least 1/10 Normal.

2. The process of claim 1 wherein the ratio of aluminum ion to fluoride is between 1/1 to 1/4.

3. The process of claim 1 wherein the acid concentration is at least 1/2 Normal.

4. The process of claim 1 wherein the ratio of aluminum ion to fluoride ion is about 1/2.

References Cited in the file of this patent

UNITED STATES PATENTS

| | | |
|---|---|---|
| 2,707,149 | McKinley | Apr. 26, 1955 |
| 2,740,709 | Herres et al. | Apr. 3, 1956 |
| 2,750,271 | Cueilleron et al. | June 12, 1956 |
| 2,758,024 | Feder et al. | Aug. 7, 1956 |